(12) United States Patent
White

(10) Patent No.: US 6,513,814 B2
(45) Date of Patent: *Feb. 4, 2003

(54) STRESS INDUCED CONNECTING ASSEMBLY

(76) Inventor: Patrick Michel White, 2208 Lancaster Ct., Mahwah, NJ (US) 07430

( * ) Notice: Subject to any disclaimer, the term of this patent is extended or adjusted under 35 U.S.C. 154(b) by 0 days.

This patent is subject to a terminal disclaimer.

(21) Appl. No.: 09/860,918

(22) Filed: May 18, 2001

(65) Prior Publication Data

US 2001/0028148 A1 Oct. 11, 2001

Related U.S. Application Data

(63) Continuation of application No. 09/523,719, filed on Mar. 11, 2000, now Pat. No. 6,257,593, which is a continuation of application No. 09/311,938, filed on May 14, 1999, now abandoned.

(51) Int. Cl.⁷ ................................. F16J 15/02
(52) U.S. Cl. ...................... 277/630; 277/650; 277/939; 285/381.3; 285/322; 285/909
(58) Field of Search .................. 285/322, 323, 285/909, 916

(56) References Cited

U.S. PATENT DOCUMENTS

| | | | | |
|---|---|---|---|---|
| 4,145,075 A | * | 3/1979 | Holzmann | |
| 4,250,348 A | * | 2/1981 | Kitagawa | |
| 4,650,228 A | * | 3/1987 | McMills et al. | |
| 4,767,135 A | * | 8/1988 | Holsmann | |
| 4,773,680 A | * | 9/1988 | Krumme | |
| 4,787,657 A | * | 11/1988 | Henniger | |
| 4,841,100 A | * | 6/1989 | Ignasiak | |
| 4,880,343 A | * | 11/1989 | Matsumoto | |
| 5,197,720 A | * | 3/1993 | Renz et al. | |
| 5,226,683 A | * | 7/1993 | Julien et al. | |
| 5,366,331 A | * | 11/1994 | Erbes | |
| 5,395,193 A | * | 3/1995 | Krumme et al. | |
| 5,405,172 A | * | 4/1995 | Mullen, Jr. | |
| 5,437,483 A | * | 8/1995 | Umezawa | |
| 5,507,826 A | * | 4/1996 | Besselink et al. | 623/22.29 |
| 5,578,034 A | * | 11/1996 | Estes | |
| 5,584,631 A | * | 12/1996 | Krumme et al. | |
| 5,630,671 A | * | 5/1997 | Larson | |
| 5,662,362 A | * | 9/1997 | Kapgan et al. | |
| 5,674,027 A | * | 10/1997 | Warnaar | |
| 5,683,404 A | * | 11/1997 | Johnson | |
| 5,725,592 A | * | 3/1998 | White et al. | 623/22 |
| 5,779,281 A | * | 7/1998 | Kapgan et al. | |
| 5,791,847 A | * | 8/1998 | Keto-Tokoi | |
| 5,858,020 A | * | 1/1999 | Johnson et al. | |
| 5,906,544 A | * | 5/1999 | Powell | 623/23 |
| 5,927,892 A | * | 7/1999 | Teh-Tsung | |
| 6,090,148 A | * | 7/2000 | Rozow, III et al. | 623/22.4 |
| 6,257,593 B1 | * | 7/2001 | White | |

* cited by examiner

Primary Examiner—Anthony Knight
Assistant Examiner—Alison K. Pickard
(74) Attorney, Agent, or Firm—John L Chiatalas

(57) ABSTRACT

A connecting assembly is disclosed having a first component defining an opening, a second component adapted to be retained together with the first component and a connector component made of a superelastic alloy. Relative motion between at least two of the components causes a superelastic activation of the connector wherein the activation simultaneously retains the components together with the connector interposed jointly therebetween. Preferably the connector component is pre-assembled to one of the first and second components. More preferably, the first component is pre-assembled with the connector and the second component is moved relative to the pre-assembled components to activate the superelastic alloy of the connector. Alternatively, the second component is pre-assembled with the connector and the first component is moved relative to the pre-assembled components to activate the superelastic alloy of the connector. In another alternative assembly, the first and second components are pre-assembled and relative motion occurs between the connector and the pre-assembled components.

23 Claims, 9 Drawing Sheets

STRESS INDUCED CONNECTING ASSEMBLY

RELATED APPLICATIONS

This application is a continuation of application Ser. No. 09/523,719 filed Mar. 11, 2000, now U.S. Pat. No. 6,257,593, which is a continuation in part of Ser. No. 09/311,938, filed May 14, 1999, now abandoned.

TECHNICAL FIELD

The present invention relates generally to metallic connectors, that is, devices that join together multiple parts by means of an intervening member, particularly connectors having one or more elements made of material that possesses super-elastic properties. The present connectors are suitable for high-performance industrial and medical applications involving different ranges of operating temperatures and component materials being connected.

BACKGROUND

The present inventor has previously filed application Ser. No. 09/311,938 entitled "Stress Induced Seal" on May 14, 1999, Ser. No. 09/440,064 entitled "Stress Induced Gasket" on Nov. 15, 1999 and Ser. No. 09/501,109 entitled "Stress Induced fastener" on Feb. 9, 2000, the entire disclosures of which are expressly incorporated by reference herein and relied upon.

The use of metallic super-elastic alloys, such as Ni—Ti (nitinol) and other bi- or tri-metal alloys, has been documented in a variety of technical applications, including fasteners, connectors, gaskets, clamps and seals. Many such uses have required temperature in order to activate the material and change its physical state, while others have used mechanical forces that impart stress to cause a super-elastic physical deformation in the material. Of particular concern to the instant inventor is the application of the super-elastic material to connectors. The use of non-corrosive, metallic super-elastic material offers a decided advantage in high performance connecting assemblies, versus more conventional connectors requiring threaded fasteners, springs, clamps or other holding or securing mechanisms. Particularly it can withstand more wear than alloys used in conventional connectors due to its harder surface characteristics. It can also withstand extreme vibrations and not loosen due its elastic preloaded condition without using conventional adhesives to hold the assembled components and/or the connector itself together. Adhesives used with conventional connectors make them very difficult to disassemble, whereas it is generally possible to make a super-elastic connector completely reversible.

U.S. Pat. Nos. 5,395,193 and 5,584,631 to Krumme et al., discuss the use of nickel-titanium shape memory retainers in an optimized elastic condition that have super-elastic or pseudo-elastic properties. These fasteners are said to be useful for eyeglass assembly; they are placed onto a pin to retain components together. However, this use does not contemplate an interposed connector.

U S. Pat. No. 5,683,404 to Johnson, entitled "Clamp and Methodfor its Use", further discusses shape memory materials that are "pseudo-elastic", defining these materials in terms of their ability to exhibit super-elastic/pseudo-elastic recovery characteristics at room temperature. Such materials are said to deform from an austenitic crystal structure to a stress-induced structure postulated to be martensitic in nature, returning thence to the austenitic state when the stress is removed. The alternate crystal structures described give the alloy super-elastic or pseudo-elastic properties. Poisson's Ratio for nitinol is about 0.3, but this ratio significantly increases up to approximately 0.5 or more when the shape memory alloy is stretched beyond its initial elastic limit. It is at this point that stress-induced martensite is said to occur, i.e., the point beyond which the material is permanently deformed and thus incapable of returning to its initial austenitic shape. A special tool is employed by Johnson to impart an external stretching force that deforms the material which force is then released to cause the material to return to its original condition. While the device is stretched, a member is captured by it and securely clamped when the stretching force is released. This device is intended for use in clamping and does not contemplate traditional connecting operations of the kind addressed by the present invention. Another use envisioned by Johnson is in connecting the modular components of a medical device, as described in his U.S. Pat. No. 5,858,020, by subjecting a thimble component made of shape memory material to an external stretching stimulus to elongate and thereby reduce its transverse dimension. Upon release of the stretching force, this component returns towards its original rest dimension, contacting and imparting a force on another component. This is a sequential stretching and relaxation of the super-elastic material rather than a simultaneous activation and retention operation. Also, special structures are necessary on the thimble to allow the stretching force to be imparted.

In U S. Pat. No. 5,197,720 to Renz, et al., a work piece is held within a clamping tool by an expansion element made of shape memory material that is activated by mechanical force. In this way, torque is transmitted through the shape memory member. This device is useful for bringing parts together for holding the work piece in order to perform an operation. It does not, however contemplate a use as a connector. U.S. Pat. No. 5,190,546 to Jervis discloses insertion into a broken bone cavity of a split member made of shape memory material using a super-elastic alloy. The split member holds the walls of the bone cavity when radial compressive forces acting on it are released. In order for the radial compressive force to reduce the diameter, the component must be split, allowing the reduction in dimension for insertion. It does not act as an interposed member in a connecting assembly.

Others have sought to utilize the properties of shape memory materials as locking, connector and bearing elements, e. g., U.S. Pat. Nos. 5,507,826 to Besselink, et al., 5,779,281 to Kapgam, et al., and 5,067,827 to, Arnold respectively; however, such approaches have required temperature to be applied during use. U.S. Pat. Nos. 5,277,435 to Kramer, et al. and 5,876,434 to Flomenblit, et al. similarly has relied upon temperature to activate the shape memory effect. Such dependence on extrinsic activation by temperature introduces an added process step and may further be disadvantageous in certain other applications.

U S. Pat. No. 5,842,312 to Krumme, et al., entitled, "Hysteretic Damping, Apparati and Methods", employs shape memory tension elements to provide energy dissipation. Such elements can be placed between building structures, etc., which are subject to vibration, serving to absorb the energy created by their relative movement. However, this patent does not contemplate the vibration dampening effect of a super-elastic material in the formation of a connector.

Accordingly, there is a need to form a connecting assembly using a durable metallic, non-corrosive connector assembly, which are simple to install using relative motion to activate the assembly.

There is a further need to form a secure connection between components that minimizes the micro-motional wear characteristics of the assembly, enhancing its useful life.

There is another need to form a fastened assembly that does not require temperature for its activation.

There is still a need to form an assembly using a fastener that adjusts for differences in thermal coefficients of expansion or contraction of dissimilar materials comprising those components being fastened.

There is still a further need for a connector with elastic properties that allow more forgiving tolerances during manufacturing of the assembly components.

According to the present invention, a connecting assembly has at least two components. A first component defines a given shape with a cross section having a first dimension. A second component defines a second given shape having a cross section which is continuous with at least a second dimension sized with interference to the first dimension, the second component being made of a super-elastic alloy. One of the first and second components includes an opening that corresponds to its associated cross-section wherein relative motion causes the first dimension to contact the second dimension, imparting a force to super-elastically expand or contract the second dimension, allowing them to be jointly retained.

SUMMARY OF INVENTION

According to an embodiment of the present invention, a connecting assembly has a first component defining an opening, a second component adapted to be retained together with the first component and a connector component made of a superelastic alloy. Relative motion between at least two of the components causes a super-elastic activation of the connector wherein the activation simultaneously retains the components together with the connector interposed jointly therebetween.

In a preferred embodiment of the present invention, the connector component is pre-assembled to one of the first and second components. More preferably, the first component is pre-assembled with the connector the second component is moved relative to the pre-assembled components to activate the superelastic alloy of the connector. Alternatively, the second component is pre-assembled with the connector and the first component is moved relative to the pre-assembled components to activate the superelastic alloy of the connector.

In another preferred embodiment, the first and second components are pre-assembled and relative motion occurs between the connector and the pre-assembled components.

In yet another embodiment of the present invention, the opening defines an axis and relative motion occurs along the axis; alternatively, the relative motion could occur normal to the axis.

In still another embodiment of the present invention, the components are rigidly retained.

In still yet another embodiment of the present invention, the connection forms a seal.

An advantage of an embodiment of the present invention is that a super-elastic alloy, e. g., nickel-titanium has an oxide layer presenting a stronger wear surface than other traditional connectors. Moreover, the connector component is elastic in nature, allowing it to act as a vibration-dampening member that prevents the assembly from loosening. Also, the components of the present assembly are more forgiving of manufacturing tolerances. These connectors are entirely reversible.

Another advantage of an embodiment of the present invention is that a connection is effected by simple relative motion, not requiring threaded fasteners, springs, clamps or other holding or securing mechanisms. This feature allows the connectors to be operable in a much smaller working space, further avoiding the complexity associated with traditional connection devices.

A further advantage of an embodiment of the present invention is that the super-elastic properties are not dependent on temperature to impart the activaton force required to effect such a connection.

Other objects and advantages will be appreciated by those skilled in the art by resort to the appended Drawings having reference numerals that correspond to the ensuing Description of one or more embodiments of the invention wherein the following Figures are further elucidated.

DETAILED DESCRIPTION OF THE DRAWINGS

Figure 16:
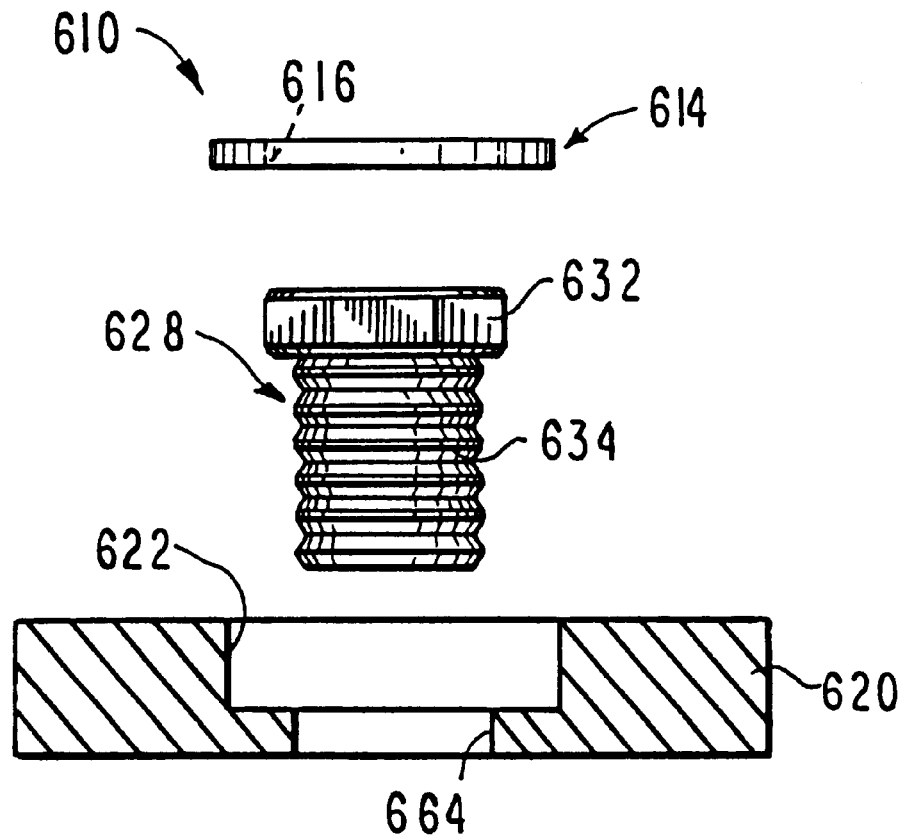
Figure 17:
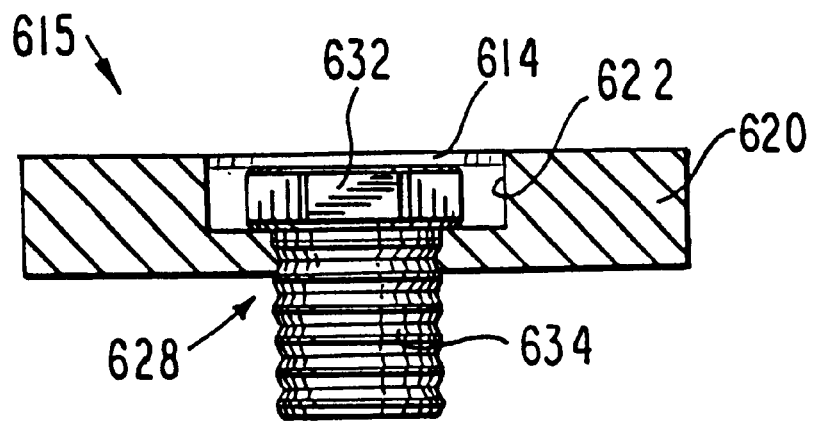

"FIG. 16 is an exploded side view, partially in cross section, of a preferred fastener seal of the present invention, showing a super-elastic cover plate prior to engagement over a bolt head in a counter-bore; and FIG. 17 is a sequential view of FIG. 16, showing the plate installed over the fastener head."

Referring again to FIGS. 1–3, a first component of assembly 10 is a ball 12 defining a given spherical shape with a cross sectional diameter having a first dimension D1. A second component consists of washer 14 defining a second given shape, in this case annular, having a cross section which is continuous with at least a second dimension D2 sized with interference to the first dimension D1. One of the first 12 and second 14 components, i. e., washer 14 in FIGS. 1–3, includes an opening 16 with an entrance edge or lip 18 that is sized to correspond to its associated continuous cross-section, i.e., the inner diameter D2. In FIG. 2, relative motion indicated by arrow 13 of ball 12 with first dimension D1 causes it to contact the second dimension D2 of washer 14, imparting a force to super-elastically expand the second dimension, allowing the ball and washer to be jointly retained with one another.

Figure 1:
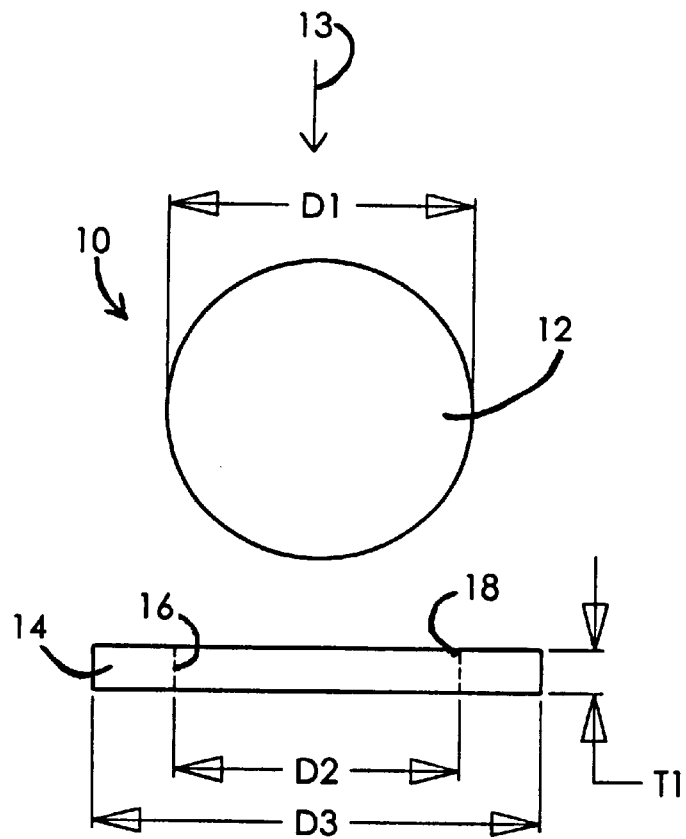
FIG. 1 is an exploded external side view of a ball and a super-elastic component (i e., a washer), shown prior to assembly, illustrating the super-elastic effect operative in the present invention.
Figure 2:
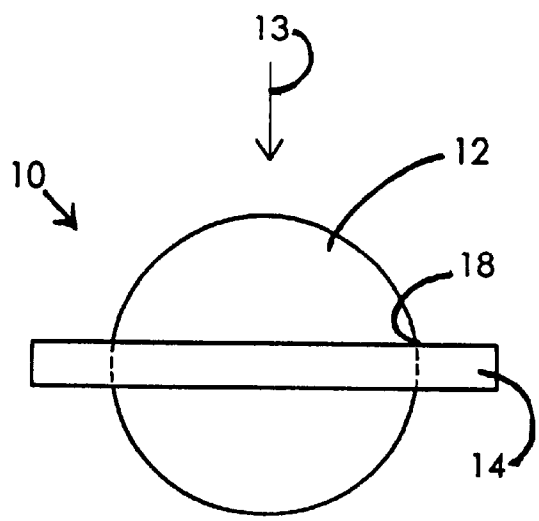
FIG. 2 is a sequential view of FIG. 1, showing the ball fully engaged with the washer to form a connection.
Figure 3:
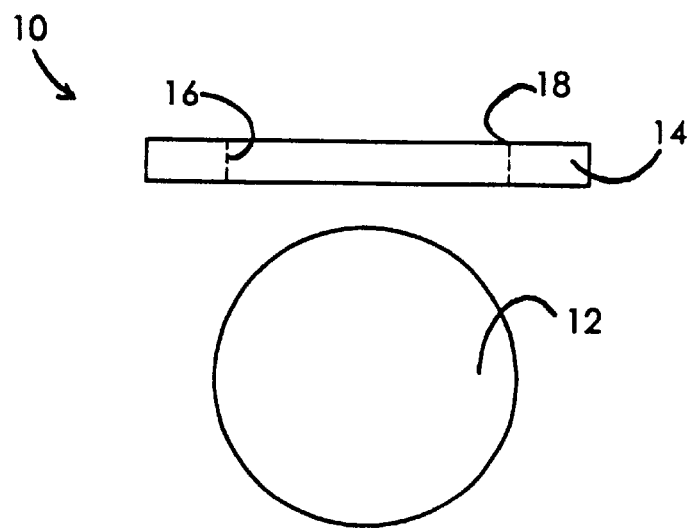
FIG. 3 is a further sequential view of FIG. 2, showing the ball pushed entirely through the washer.

Referring still to FIGS. 1–3 first dimension D1 is preferably greater than second dimension D2 and the relative motion of the first 12 and second 14 component causes the second dimension to expand Although not shown in these Figures, the assembly 10 may be provided with means for creating the relative motion 13; however, it is possible to impart the necessary force to assemble the components 12, 14 using an external source, e. g., a mechanical press, lever or a clamp, etc.

Washer 14 is preferably an integral member made of a super-elastic alloy, preferably nitinol, and more preferably SE508 nitinol. This material is described in "Nitinol SE508 Data Sheet", and is available from Nitinol Devices & Components, Inc., located in Fremont, Calif. All of the super-elastic components referred to herein preferably are made of Nitinol SE508.

Experiment 1

Washer 12 of FIGS. 1–3 was placed in a mechanical clamping structure (not shown) at room temperature prior to forming the experimental assembly 10. Ball 12 was made of polished stainless steel, with a uniform spherical diameter D1 of 0.375 inches. The initial resting dimensions of washer 14 were as follows: inner diameter D2=0.360; outer diameter D3=0.550; thickness T1=0.050. Washer 14 was placed under the press with its axial movement constrained by a support plate having an aperture (further not shown) underlying opening 16, the plate limiting the downward motion of the washer. Ball 12 was placed at the entrance to opening 16 and the press engaged to move the ball downward, forcing it into the opening. The super-elastic material of washer 14 was activated by ball 12 in response to the expansion of its inner diameter D2, by interference with the diameter D1 of the ball, up to a maximum insertion of the ball as shown in FIG. 2. The outer diameter D3 of washer 14 was then measured with ball 12 thus inserted and it was observed to increase 0.014 inches to a new diameter D2 of 0.564 inches. That is, the outer diameter D3 of washer 14 expanded 0.014 inches, in nearly direct proportion to the difference between the ball diameter D1 and the inner diameter D2 of the washer. Neither the diameter D1 of ball 12 nor thickness T1 of washer 14 were observed to change. Ball 12 was then pushed completely through the inner diameter D2 of washer 12, whereupon the dimensions of the washer were measured as follows: outer diameter D3=0.556; and inner diameter =0.367. Therefore, some of the deformation was of a "plastic" nature, that is, the dimensions of washer 14 were permanently altered. Because the super-elastic material was in the austenitic state, there was no return to the extent of such plastic deformation. The 1–2% stated elastic capacity was thus exceeded, and so the plastic deformation ensued to the extent it was beyond this elastic capacity. In order to verify the results observed above, I repeated this experiment with a different washer having substantially the same dimensions and observed similar results.

Experiment 2

The same ball 12 and washer 14 from the initial run of Experiment 1 was used to form the assembly 10. I postulated that the maximum plastic deformation had already occurred and, thus, would not further change. It was expected that the washer 14 would preserve its super-elastic properties and continue to admit ball 12 into opening 16, therefore expanding the resting dimensions of the washer in the manner observed for the initial run of Experiment 1. I observed that the inner D2 and outer D3 diameters of washer 14 measurably expanded to practically the same dimensions as was observed before, not greater or less. When ball 12 was pushed through opening 16, the same dimensions were observed as at the conclusion of the initial run of Experiment 1. A uniform band or swath 17 (FIG. 3) was observed upon passage of ball 12 through washer 14 (FIG. 3), in the circumferential area of diameter D1 corresponding to its contact with the super-elastic material of the inner diameter D2. This indicates that an even seal was effectively formed in a substantial area surrounding the circumference of ball 12, rather than a narrow line of contact. Thus it is concluded that the super-elastic material deformed in response to the stress-activated seal formation by the relative motion, conforming to the contour of ball 12. With further reference to FIGS. 1–3, either of the first 12 and second 14 components the experimental assembly 10 had a tapered lead to facilitate activation of the super-elastic alloy. Lip 18 of opening 16 may have a chamfered entrance edge (not shown), functioning as a lead-in that makes easier the insertion of the first dimension D1 into the second dimension D2.

Figures 4A, 4B:
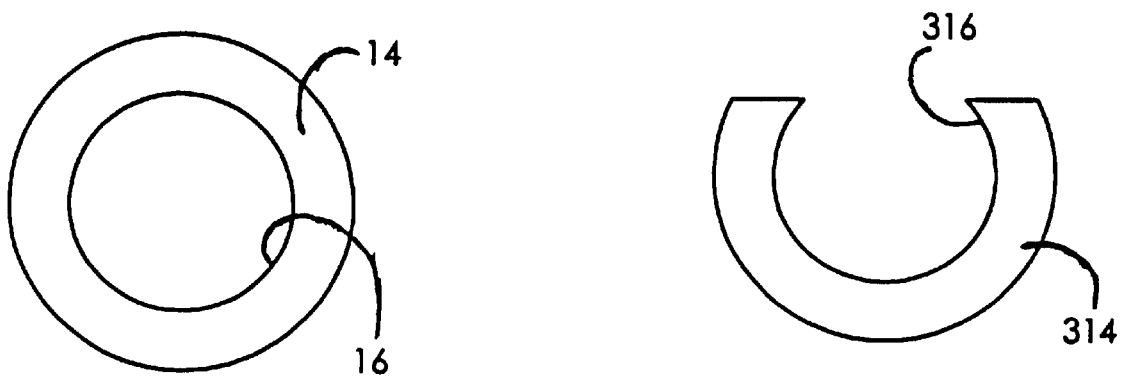
FIG. 4A is a top plan view of the washer of FIG. 3.
FIG. 4B is a top plan view of an alternative, open sided washer.
Figure 10:
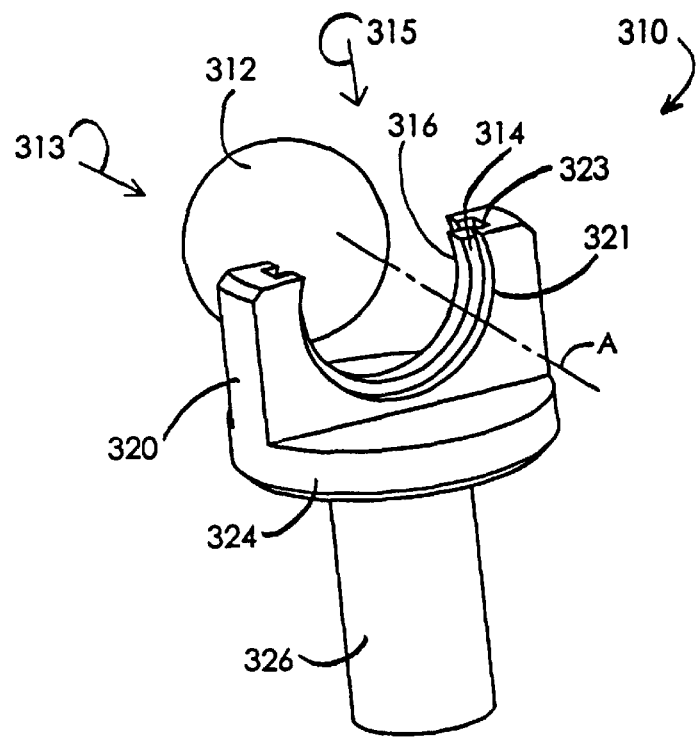
FIG. 10 is a perspective view of an open sided connecting assembly of the present invention, showing a first component and a connector component pre-assembled prior to activation of the connector by a second component i. e., ball.
Figure 11:
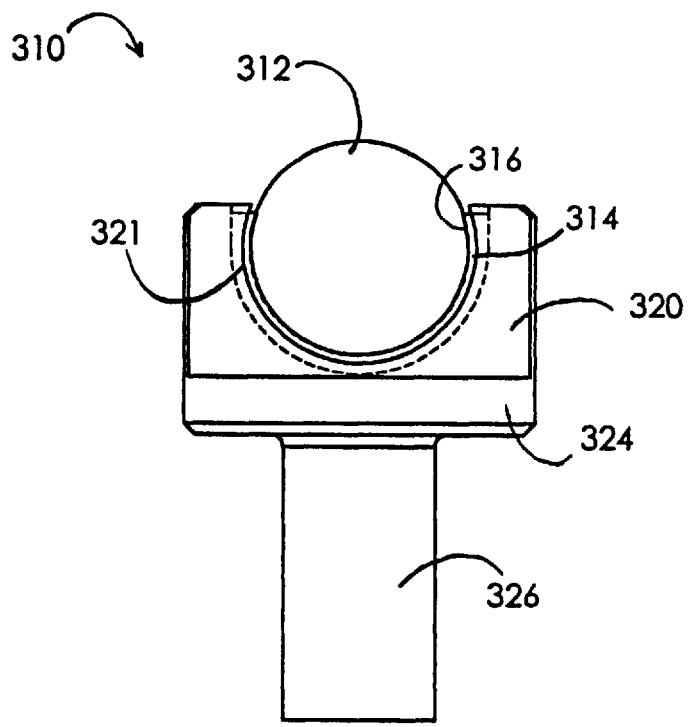
FIG. 11 is a sequential front view of FIG. 10 showing the components retained together upon activation of the connector (shown in phantom) by relative motion of the ball.
Figure 12:
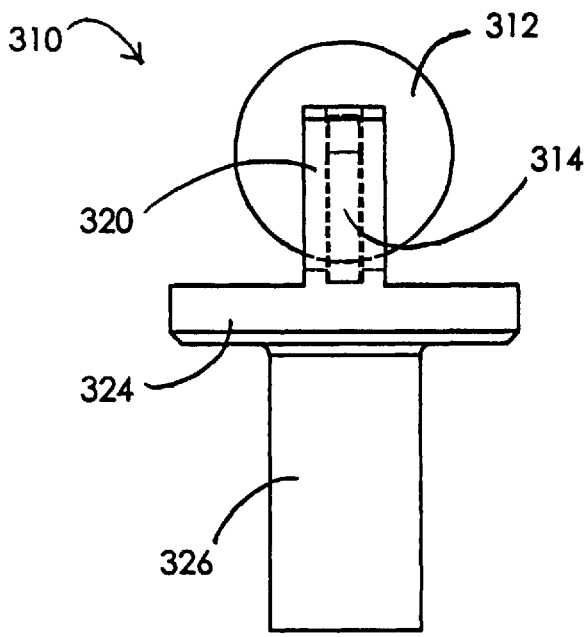
FIG. 12 is a side view of FIG. 11.

Returning to FIG. 4B and with reference to FIGS. 10–12, a connector component in the form of an alternative washer is shown at 314 with an opening 316. This washer 314 is configured for use in the connector assembly generally shown at 310 as will be described below.

Figure 5:
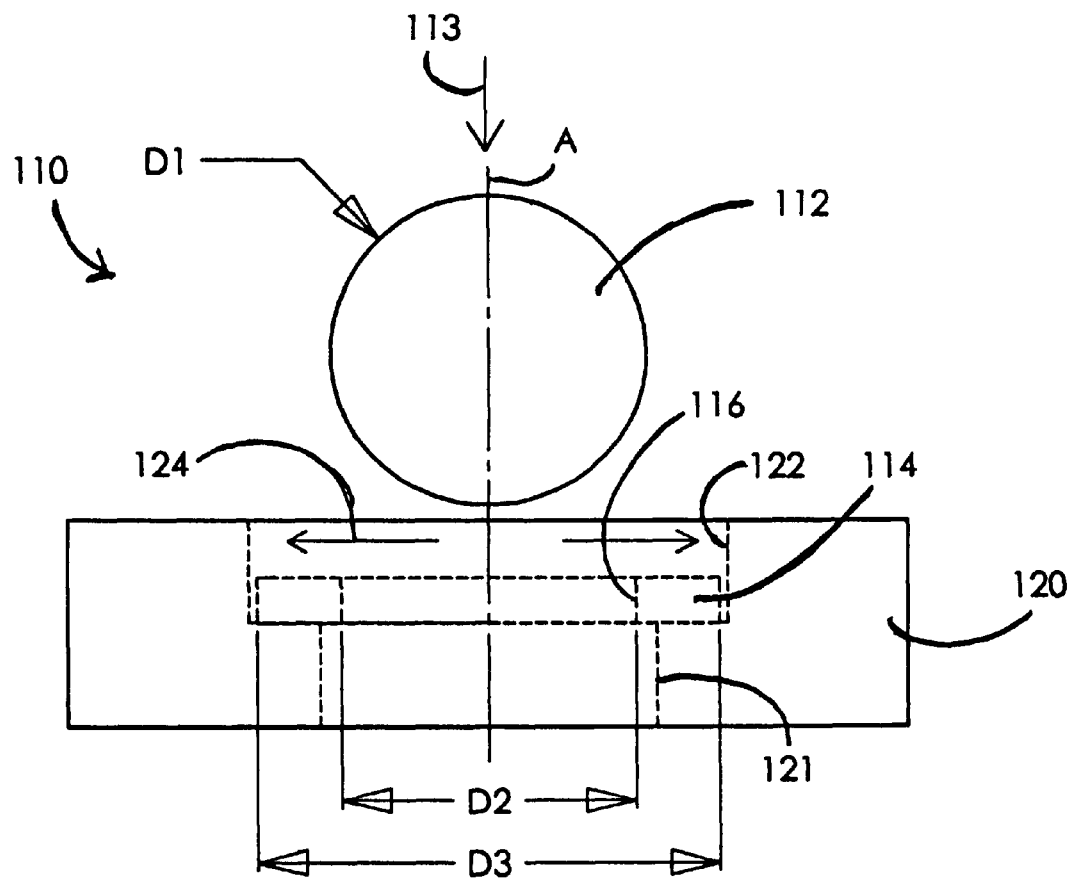
FIG. 5 is side view of a connector assembly of the invention showing a first component with an opening, a second component in the form of a ball, and a connector component (shown in phantom) in the form of a washer, prior to assembly.
Figure 6:
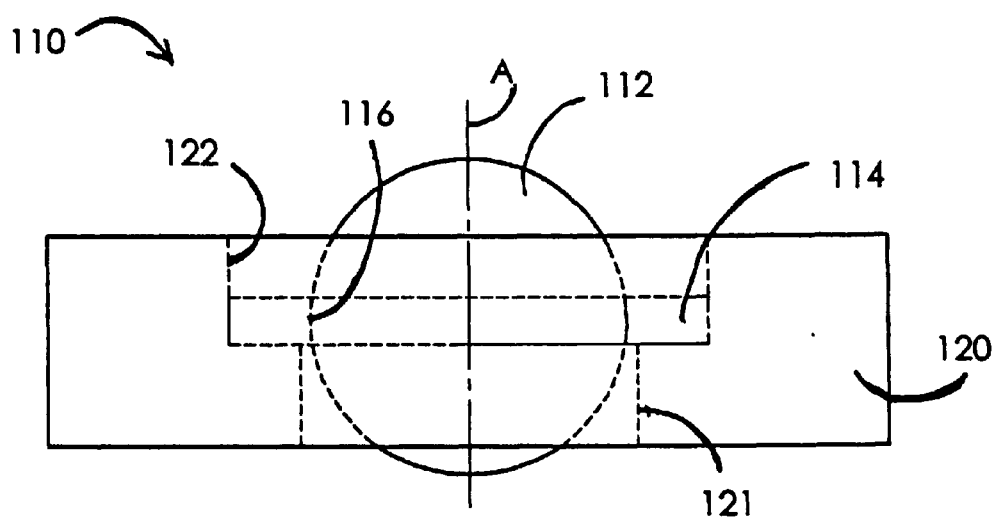
FIG. 6 is a sequential view of FIG. 5 showing the components assembled (shown partially in phantom)
Figure 7:
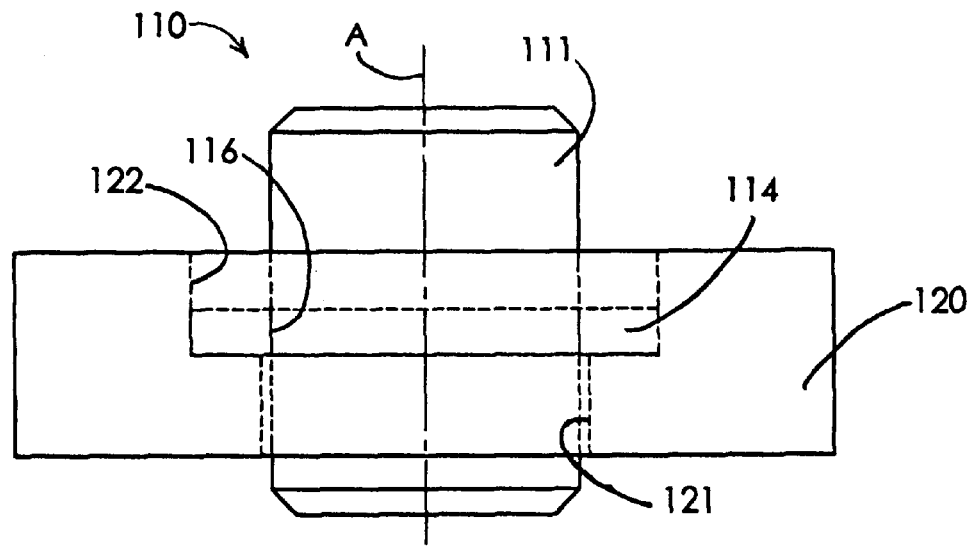
FIG. 7 is a side view of a connecting assembly similar to that shown in FIG. 5 with an alternative second component in the form of a pin.

In FIGS. 5–6, a connection assembly is generally shown at 110. A ball 112 and a washer 114 are similar to those shown by FIGS. 1–3, except they are activated within a third component represented by a body 120 having an opening consisting of a through-bore 121 with a counterbore 122 within which the washer is placed. Washer 114 has an opening 116. Through-bore 121 has a central axis A which, preferably, also passes through the center of opening 116. The ball 112 is moved in the direction indicated by arrow 113 along axis A, that is, relative axial motion, into opening 116 (FIG. 6) inducing an internal stress in the connector causing opening 116 to super-elastically expand in the direction of diverging arrows 124. Likewise the outer diameter D3 expands to engage and form a connection against counter-bore 122. Because the outer diameter of washer D3, when engaged with counter-bore 122, exerts an inward radial force shown by arrows 126, the inner diameter D2 further contracts and exerts additional force on ball 112. FIG. 7 is similar to FIGS. 5–6 but for the substitution of pin 111 for ball 112.

Figure 8:
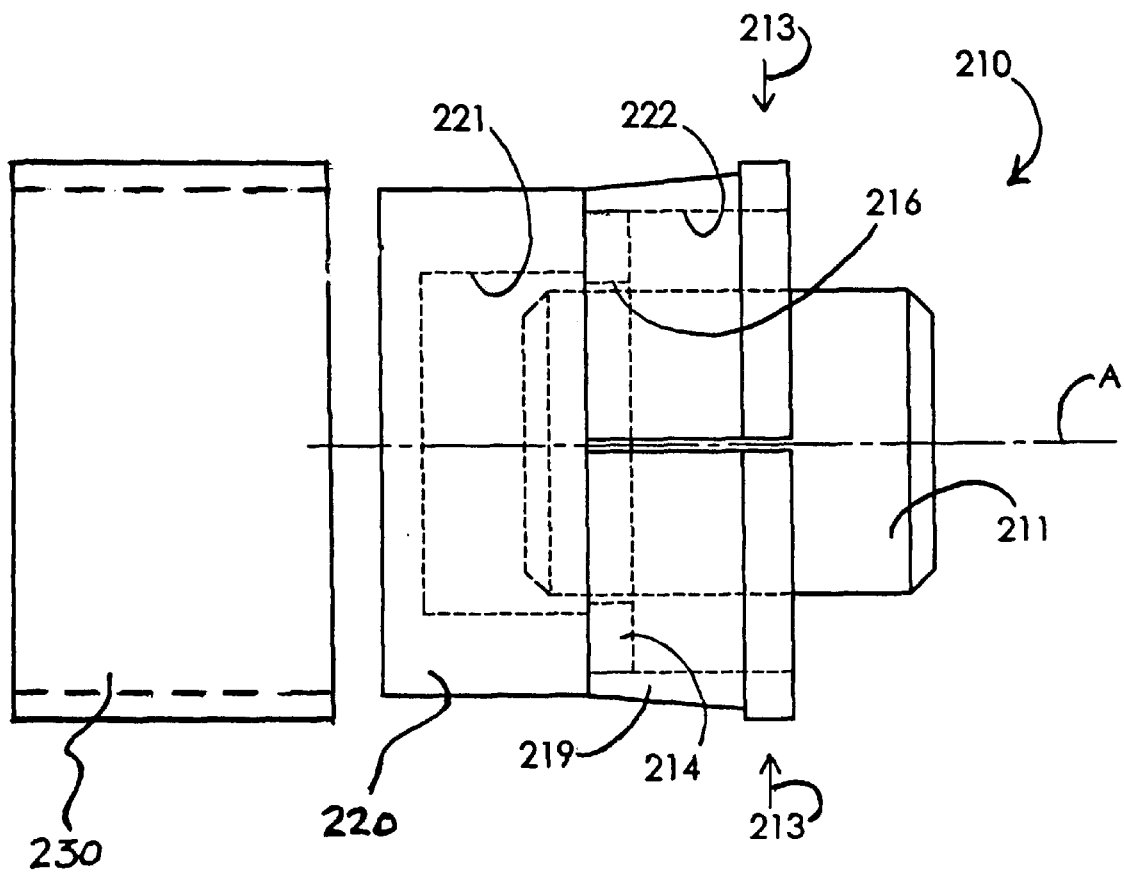
FIG. 8 is a side view of a connecting assembly of the present invention, prior to activation by an external force, showing a first component with a collet activating a pre-assembled connector component (washer shown in phantom) to retain the second component (i.e., pin partially shown in phantom)
Figure 9:
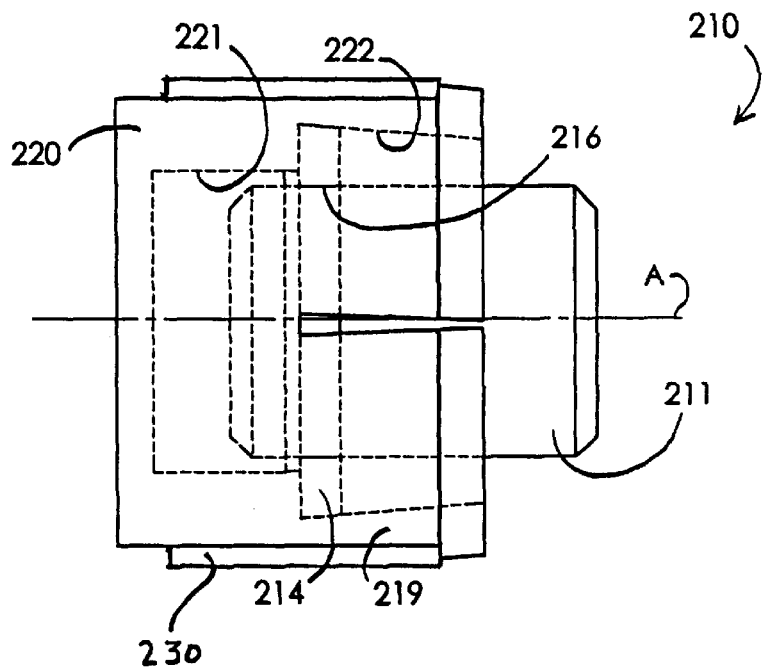
FIG. 9 is a sequential view of FIG. 8 showing the components retained together upon activation of connector component (shown in phantom) by an external force applied to the collet.

The components can be connected in various ways either by pre-assembling two of the components as shown in FIGS. 8 and 10 then assembling these with the third in a final assembly as in FIGS. 9 and 11–12. Tolerances can be chosen, as will be appreciated by those skilled in the art, so that there is an initial interference fit between components so that they can be temporarily held together in preparation for the final assembly. Alternatively, the tolerances could be chosen so that, while in the pre-assembled state, the components are loosely placed into position in preparation for final assembly as shown in FIGS. 5–7 and 13–15.

In FIGS. 8–9, a connecting assembly is generally shown at 210 with a first component in the form of a body 220 including a collet 219. A second component in the form of pin 211 and a connector component in the form of a washer 214 are provided, similar to those shown in FIG. 7. Body 220 has an opening consisting of a bore 221 with a counter-bore 222 within which washer 214 is placed. Similar to FIGS. 1–7, washer 214 has an opening 216. Bore 221 has a central axis A which, preferably, also passes through the center of opening 216. Pm 211 is pre-assembled in a loose-fitting relationship within opening 216. Collet 219 is radially compressed in the direction indicated by arrow 213 along axis A, that is, relative motion is in a direction normal to axis A thereby inducing an internal stress in connector 214 causing opening 116 to super-elastically contract effecting the connection. Inherently, when the super-elastic component 214 is activated by collet 219, the outside dimension D3 of the super-elastic component elastically contract effecting a connection between the collet and the superelastic component. The connection between collet 219 and superelastic component 214 is effected prior to the connection between the collet and pin 211. Various means could be employed to radially compress collet 219 in a direction normal to axis A, e. g, the slidably adjustable sleeve 230 of FIGS. 8–9, as will be appreciated by those skilled in the art. It is to be understood that the term "relative motion" encompasses the axial motion described in conjunction with FIGS. 1–7, as well as the radial compression of collet 219 in FIGS. 8–9 which results in motion of the collet in a direction normal to axis A relative to bore 221.

In FIGS. 10–12, a connecting assembly is generally shown at 310. A connector component represented by a washer 314, is pre-assembled with a first component represented by a body 320. Body 320 has an opening consisting of an open through-bore 321 with a groove 323 within which the washer 314 is placed. Washer 314 has an opening 316. Through-bore 321 has a central axis A which, preferably, also passes through the center of opening 316. A ball 312 is moved in the direction indicated by arrow 313 along axis A, that is, relative axial motion, into opening 316. Alternatively ball 312 can be moved in a direction indicated by arrow 315 normal to axis A, into the opening 316. As ball 312 enters washer opening 316, it induces an internal stress in washer 314, causing the opening to super-elastically expand engaging the groove 323 effecting a connection. Body 320 preferably has a base 324 and a shaft 326 projecting therefrom.

Figure 13:
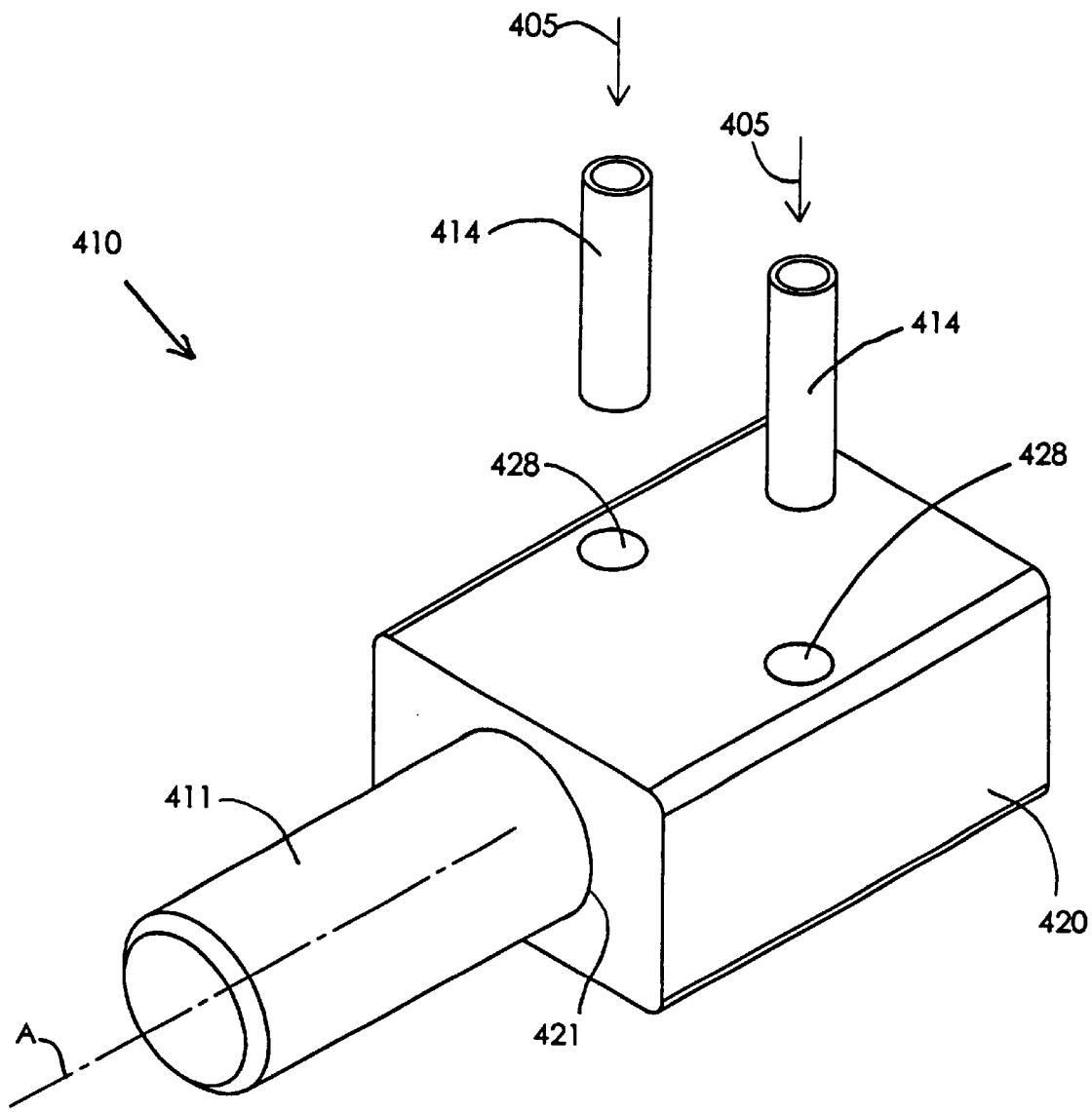
FIG. 13 shows a perspective view of a connecting assembly of the present invention with a first component (body) pre-assembled with a second component (pin) prior to activation of multiple connector components (tubes) to retain the pre-assembled components.
Figure 14:
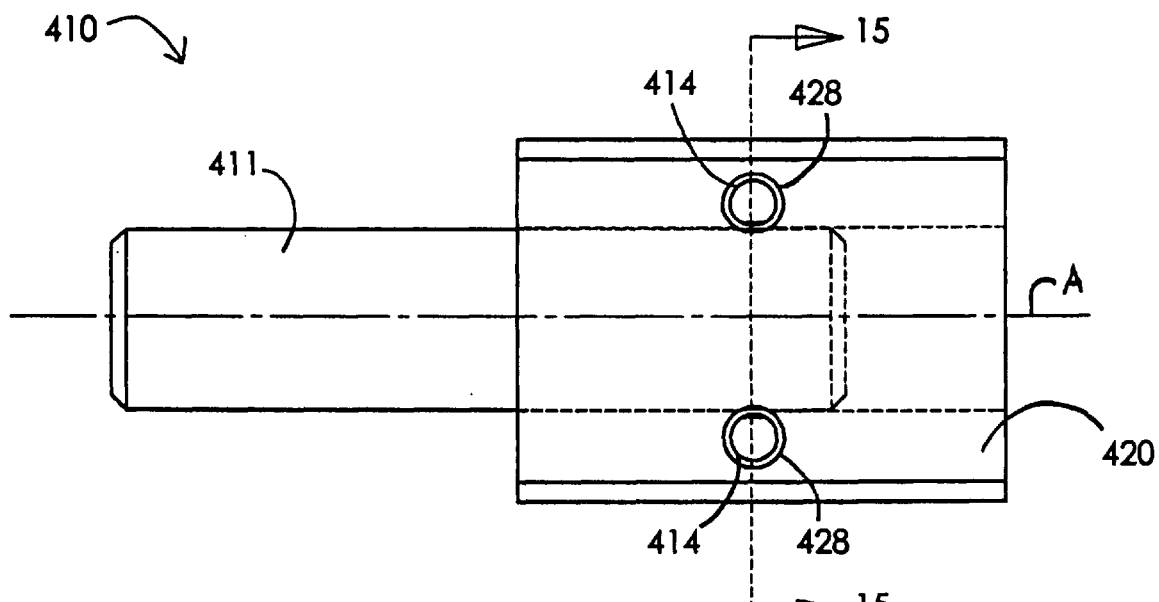
FIG. 14 is a sequential top view of FIG. 13 showing the assembly with its components connected.
Figure 15:
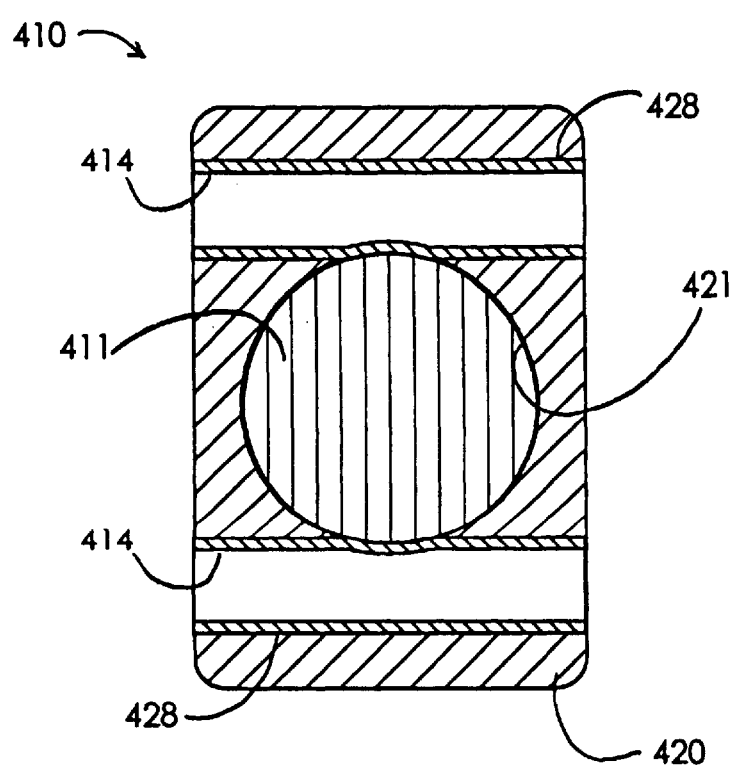
FIG. 15 is a cross sectional view taken substantially along lines 15—15 of FIG. 14, showing deformation of the super-elastic connector tubes.

In FIGS. 13–15, a connecting assembly is generally shown at 410. A first component body 420 has a through bore 421 defining an axis A. A second component shown as a pin 411 is pre-assembled within the bore 421 in a loosely fitting relationship. Connector component represented by at least one, preferably a pair of pegs 414, are aligned with through holes 428 in the body 420. The through holes 428 run normal to axis A and pass partially into the through bore 421. The pegs 414 are inserted in the direction of arrows 405 into the through holes 428 in the body 420. As the pegs 414 are inserted in an interposed relationship to the body 420 and the pin 411 a super-elastic response is induced in the pegs 414 effecting a connection. In an alternative the pegs 414 can be pre-assembled in the through holes 428 in the body 420. Then, the pin 411 is moved axially within the through bore 421 bringing it into contact with the pegs 414 effecting a connection.

While one or more preferred embodiments of the present invention have been described, it should be understood that various changes, adaptations and modifications may be made without departing from the spirit of the invention and the scope of the appended claims.

The fastening seal assembly is shown in FIGS. 16–17, a washer 614 made of a super-elastic material is used to seal a fastener 628 recieved within a threaded aperture 664 formed in a body 620. The body 620 has an opening leading into a counter-bore 622 within which both the head 632 of the fastener 628 and the washer 614 are recieved, as in FIG. 17. The outside diameter of the washer 614 can be sized larger than the ID of the counter-bore 622. Inherently then, the washer 614 is moved in an axial direction into interfering contact with the counter-bore 622, the inference causes a super-elastic activation in the washer 614. The washer 614 then contracts allowing the washer to connect against the counter-bore 622. At the same time the stress activation also causes the inner diameter of the washer 614 to contract.

What is claimed is:

1. A connecting assembly comprising,
   a first component defining a bore, and
   a washer component made of a super-elastic alloy, whereupon
   relative motion between the components causes an interference between the washer and the bore creating a super-elastic activation in the washer, the activation simultaneously. The connecting the components together in an operatively fixed relative position.

2. Assembly of claim 1 wherein the bore defines an axis, and the washer defines an axis.

3. The assembly of claim 2 wherein the axes are positioned in alignment.

4. The assembly of claim 3 wherein the relative motion occurs in a direction parallel to the axes.

5. The assembly of claim 1 further comprises a third component that is retained with the assembly as the connection is effected.

6. The assembly of claim 5 wherein the third component is mobile within the assembly.

7. The assembly of claim 1 wherein the washer component is nitinol.

8. The assembly of claim 1 wherein the super-elastic properties of the washer are exhibited within the operating temperature range of the assembly.

9. The assembly of claim 1 wherein washer effects a seal.

10. A connecting assembly comprising,
    a first component with a body defining a bore with an axis, presenting a radially compressible portion, and
    a second component made of a super-elastic alloy with a hole defining an axis, whereupon
    relative motion between the first component and the second component causes a super-elastic activation in the second component, the activation simultaneously connecting the components together in an operatively fixed relative position.

11. The assembly of claim 10 wherein the bore axis and the second component axis are aligned.

12. The assembly of claim 11 wherein the relative motion occurs in a direction substantially perpendicular to the axes.

13. The assembly of claim 10 wherein the radially compressible portion is enabled by slits formed in the body.

14. The assembly of claim 13 further comprising a sleeve component defining an axis aligned with the bore axis.

15. The assembly of claim 14 wherein relative axial motion between the sleeve component and the radially compressible portion cause the radially compressible portion to move in a substantially perpendicular direction to the body bore axis.

16. The assembly of claim 15 wherein the motion of the radially compressible portion causes the super-elastic activation.

17. The assembly of claim 10 wherein the second component is made of a nickle-titanium alloy.

18. The assembly of claim 10 wherein the super-elastic properties of the second component are exhibited within the operating temperature range of the assembly.

19. A connecting assembly comprising,
 a first component with a body defining a bore with an axis, the body having slits to enable a portion to be radially compressible,
 a second component made of a super-elastic nitinol alloy with a hole defining an axis aligned with the bore axis, and
 a third sleeve component defining an axis aligned with the bore axis, whereupon
 relative axial motion between the sleeve component and the radially compressible portion cause the radially compressible portion to move in a direction substantially normal to the bore axis contacting the nitinol component causing a super-elastic activation, the activation simultaneously connecting the components together in an operatively fixed relative position.

20. The assembly of claim 19 wherein the super-elastic properties of the nitinol are exhibited within the operating temperature range of the assembly.

21. A connectng assembly comprising:
 a first component with a body defining a bore with an axis, presenting a radially compressable portion; and
 a second component made of a super-elastic alloy with an axis, whereupon
 relative motion between the first component and the second component causes a super-elastic activation in the second component, the activation simultaneously connecting the components together in an operatively fixed relative position.

22. A connecting assembly comprising:
 a first component with a body defining a bore with an axis, including a collet with slits; and
 a second component made of a super-elastic alloy with a hole defining an axis, whereupon
 relative motion between the first component and the second component causes a super-elastic activation in the second component, the activation simultaneously connecting the components together in an operatively relative position.

23. The connecting assembly of claim 22 wherein the slits allow the collet to be radially compressed.

* * * * *